US011524551B2

(12) United States Patent
Takase

(10) Patent No.: US 11,524,551 B2
(45) Date of Patent: Dec. 13, 2022

(54) ABNORMALITY DIAGNOSIS DEVICE FOR BLOWER SYSTEM

(71) Applicant: TOYOTA JIDOSHA KABUSHIKI KAISHA, Susono (JP)

(72) Inventor: Kohei Takase, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 10 days.

(21) Appl. No.: 17/340,090

(22) Filed: Jun. 7, 2021

(65) Prior Publication Data
US 2022/0048364 A1 Feb. 17, 2022

(30) Foreign Application Priority Data
Aug. 12, 2020 (JP) .............................. JP2020-136400

(51) Int. Cl.
*B60H 1/00* (2006.01)
(52) U.S. Cl.
CPC ..... *B60H 1/00978* (2013.01); *B60H 1/00278* (2013.01); *B60H 1/00807* (2013.01); *B60H 1/00864* (2013.01); *B60H 1/004* (2013.01)
(58) Field of Classification Search
CPC ............ B60H 1/00978; B60H 1/00278; B60H 1/00807; B60H 1/00864; B60H 1/004; B60H 2001/3261; B60H 1/0005; B60H 1/00828; B60H 1/00585; B60H 1/00735; B60H 1/00842; H01M 2220/20; H01M 10/486; H01M 10/613; H01M 10/625; H01M 10/633; H01M 10/6563; Y02E 60/10
See application file for complete search history.

(56) References Cited

U.S. PATENT DOCUMENTS

| 4,827,730 | A | * | 5/1989 | Doi | .................... B60H 1/00978 |
| | | | | | 236/94 |
| 6,016,964 | A | | 1/2000 | Ohkubo | |
| 2009/0249803 | A1 | * | 10/2009 | Suzuki | .................... G05B 9/02 |
| | | | | | 62/157 |
| 2010/0116568 | A1 | | 5/2010 | Kadoi | |
| 2016/0301116 | A1 | * | 10/2016 | Ochiai | .............. H01M 10/6563 |

FOREIGN PATENT DOCUMENTS

| JP | H9286223 A | 11/1997 |
| JP | H10291407 A | 11/1998 |
| JP | 200983672 A | 4/2009 |

* cited by examiner

*Primary Examiner* — Marc E Norman
*Assistant Examiner* — Matthew John Moscola
(74) *Attorney, Agent, or Firm* — Hauptman Ham, LLP

(57) ABSTRACT

An abnormality diagnosis device that performs an abnormality diagnosis on a blower system that sends air to a plurality of air receiving objects obtains a target operating state of an airflow control device that controls airflow to the air receiving objects, obtains a temperature detected by a temperature sensor that detects a first temperature as a temperature of air fed to a first air receiving object as one of the air receiving objects or a temperature of the first air receiving object, estimates the first temperature, based on the target operating state of the airflow control device, and performs abnormality diagnosis on the airflow control device. The abnormality diagnosis device determines that there is an abnormality in the airflow control device, when a difference between the detected first temperature and the estimated first temperature is equal to or larger than a predetermined first reference value.

9 Claims, 10 Drawing Sheets

ABNORMALITY DIAGNOSIS DEVICE FOR BLOWER SYSTEM

CROSS-REFERENCE TO RELATED APPLICATION

This application claims priority to Japanese Patent Application No. 2020-136400 filed on Aug. 12, 2020, incorporated herein by reference in its entirety.

BACKGROUND

1. Technical Field

The disclosure relates to an abnormality diagnosis device for a blower system.

2. Description of Related Art

Blower systems, such as air conditioning systems for vehicles, which send air to air receiving objects are known in the art (see Japanese Unexamined Patent Application Publications No. 09-286223 (JP 09-286223 A), No. 2009-083672 (JP 2009-083672 A), and No. 10-291407 (JP 10-291407 A), for example). In particular, a fault diagnosis device that performs fault diagnosis on actuators for air conditioning used in an air conditioning system is disclosed in JP 09-286223A. The fault diagnosis device described in JP 09-286223 A performs fault diagnosis, by controlling the actuators for air conditioning to operating states corresponding to a fault diagnosis pattern, and having an inspector check if the state of the air conditioning system at this time matches the state corresponding to the fault diagnosis pattern.

SUMMARY

With the fault diagnosis device as described in JP 09-286223 A, the actuators for air conditioning are controlled to the operating states corresponding to the fault diagnosis pattern, and then, the inspector finally checks the states of the actuators, so as to make fault diagnosis on the actuators. Accordingly, the fault diagnosis device as described in JP 09-286223 A cannot detect an abnormality in the blower system including the actuators for air conditioning, by itself.

The disclosure provides an abnormality diagnosis device that can automatically detect an abnormality in a blower system, without depending on an inspector.

The gist of the disclosure is as follows.

(1) An abnormality diagnosis device that performs an abnormality diagnosis on a blower system that sends air to a plurality of air receiving objects is provided. The abnormality diagnosis device includes an operating state obtaining unit that obtains a target operating state of an airflow control device that controls flow of air to the air receiving objects, a temperature obtaining unit that obtains a temperature detected by a temperature sensor that detects a first temperature as a temperature of air fed to a first air receiving object as one of the air receiving objects or a temperature of the first air receiving object, a temperature estimating unit that estimates the first temperature, based on the target operating state of the airflow control device, and an abnormality diagnosing unit that performs an abnormality diagnosis on the airflow control device. The abnormality diagnosing unit determines that there is an abnormality in the airflow control device, when a difference between the first temperature obtained by the temperature obtaining unit and the first temperature estimated by the temperature estimating unit is equal to or larger than a predetermined first reference value.

(2) In the abnormality diagnosis device as described in the above paragraph (1), the airflow control device may comprise a first airflow control device and a second airflow control device which control a flow rate of air fed to the first air receiving object. The abnormality diagnosing unit may perform an abnormality diagnosis on the second airflow control device, based on a parameter other than the first temperature. The abnormality diagnosing unit may determine, when determining that there is no abnormality in the second airflow control device, that there is an abnormality in the first airflow control device, when the difference between the first temperature obtained by the temperature obtaining unit and the first temperature obtained by the temperature estimating unit is equal to or larger than the first reference value.

(3) In the abnormality diagnosis device as described in the above paragraph (2), the first air receiving object may be an air passage located downstream of the airflow control device, and the first temperature may be a temperature of air in the air passage. The abnormality diagnosing unit may determine that there is an abnormality in the first airflow control device, when the difference between the first temperature obtained by the temperature obtaining unit and the first temperature estimated by the temperature estimating unit is equal to or larger than the first reference value, in the case where air that flows toward the first air receiving object is heated or cooled by a temperature controller that heats or cools the air flowing toward the first air receiving object.

(4) In the abnormality diagnosis device as described in the above paragraph (3), the air passage as the first air receiving object may communicate with a vent that is open to a vehicle cabin.

(5) In the abnormality diagnosis device as described in any one of the above paragraphs (2) to (4), the blower system may include a first air passage and a second air passage which lead to the first air receiving object, and the first airflow control device may be an air conditioning door that controls an opening of the second air passage. The second airflow control device may be a blower that blows air to the first air passage and the second air passage, or an air mixing door that controls a ratio of openings of the first air passage and the second air passage.

(6) In the abnormality diagnosis device as described in the above paragraph (1) or (2), the first air receiving object may be a heat generating device, and the first temperature may be a temperature of the heat generating device.

(7) In the abnormality diagnosis device as described in the above paragraph (6), the temperature estimating unit may estimate the temperature of the heat generating device, based on an amount of heat released from the heat generating device, and the amount of heat released from the heat generating device may be calculated, based on a flow rate of air fed to the heat generating device calculated based on the target operating state of the airflow control device, and a difference between the temperature of the heat generating device and a temperature of the air fed to the heat generating device.

(8) In the abnormality diagnosis device as described in the above paragraph (7), the heat generating device may be a battery.

(9) In the abnormality diagnosis device as described in the above paragraph (2), the first airflow control device may be a battery door that controls an opening of a branch air passage that communicates with a battery as the first air receiving object, and the second airflow control device may be a blower that blows air into the branch air passage.

(10) The abnormality diagnosis device as described in any one of the above paragraphs (1) to (9) may further include a warning sending unit that sends a signal to a warning device to generate a warning to a user of the blower system, when the abnormality diagnosing unit determines that there is an abnormality in the airflow control device.

(11) In the abnormality diagnosis device as described in any one of the above paragraphs (1) to (10), the temperature obtaining unit may obtain a temperature detected by a temperature sensor that detects a second temperature as a temperature of air fed to a second air receiving object as one of the air receiving objects that is different from the first air receiving object, or a temperature of the second air receiving object, and the temperature estimating unit may estimate the second temperature, based on the target operating state of the airflow control device. The abnormality diagnosing unit may determine that there is an abnormality in the airflow control device, when a difference between the second temperature obtained by the temperature obtaining unit and the second temperature estimated by the temperature estimating unit is equal to or larger than a predetermined second reference value.

According to the disclosure, the abnormality diagnosis device can automatically detect an abnormality in the blower system, without depending on the inspector.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
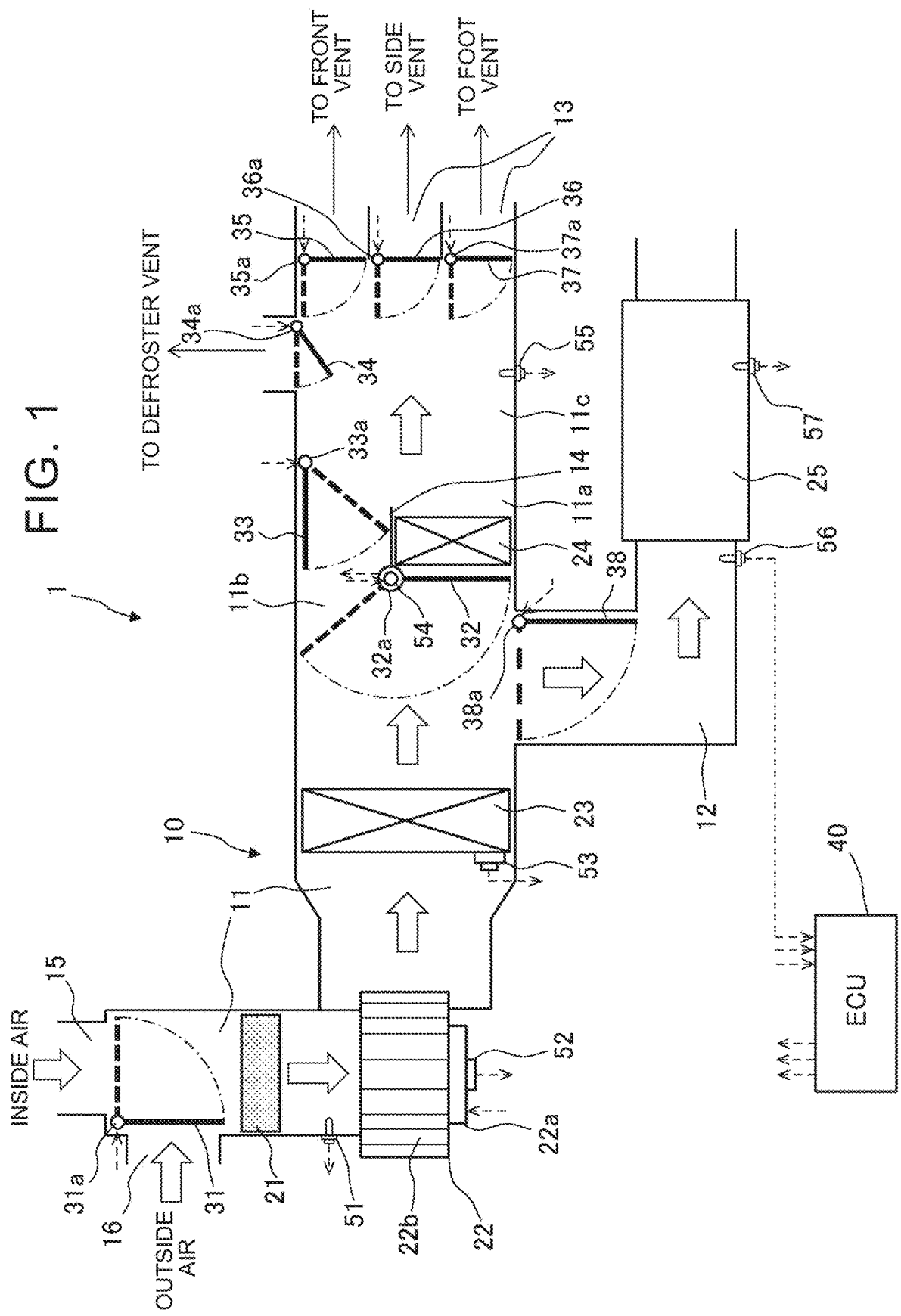
FIG. 1 is a view schematically showing the configuration of a blower system.

Referring to the drawings, one embodiment will be described in detail. In the following description, the same reference signs will be assigned to the same or similar constituent elements.

Configuration of Blower System

Referring first to FIG. 1, the configuration of a blower system 1 for a vehicle, such as an electric vehicle or a hybrid vehicle, will be described. The blower system 1 is used for sending air into a vehicle cabin for air conditioning of the vehicle, and also sending air to a heat generating device of the vehicle for cooling of the heat generating device. In this embodiment, the heat generating device of the vehicle is a battery that supplies electric power to a motor that drives the vehicle.

FIG. 1 schematically shows the configuration of the blower system 1. As shown in FIG. 1, the blower system 1 includes a duct 10 through which air flows. The duct 10 includes a main duct 11, branch duct 12 that branches off from the main duct 11, and a plurality of division ducts 13 into which the main duct 11 is divided. The duct 10 forms an air passage through which the air flows. The main duct 11, branch duct 12, and division ducts 13 form a main air passage, branch air passage, and division air passages, respectively.

The main duct 11 communicates with an inside air inlet 15 and an outside air inlet 16, and air in the vehicle cabin or air outside the cabin is introduced into the main duct 11. The entire air introduced into the blower system 1 through the inside air inlet 15 or outside air inlet 16 flows through the main duct 11, and flows into one of the branch duct 12 and division ducts 13.

A partition plate 14, which is provided in a region of the main duct 11, divides the main air passage in the main duct 11, into two air passages. Thus, the main air passage in regions other than the region provided with the partition plate 14 is a single, whole passage, and the region provided with the partition plate 14 is divided into a first air passage 11a and a second air passage 11b. In this embodiment, the partition plate 14 is disposed downstream of a branch portion where the branch duct 12 branches off from the main duct 11.

The branch duct 12 has one end portion that communicates with the main duct 11, and the other end portion that is open to the atmosphere outside the vehicle cabin. Thus, in the branch duct 12, the air flows from the main duct 11 toward the atmosphere. In this embodiment, the blower system 1 has only one branch duct 12.

Each of the division ducts 13 has one end portion that communicates with the main duct 11, and the other end portion that communicates with each air vent that is open to the vehicle cabin. In this embodiment, the blower system 1 has four division ducts 13, which communicate with a defroster vent, front vent, side vent, and foot vent, respectively. The defroster vent is a vent through which wind blows toward the inner surface of a front windshield, for example. The front vent and side vent are vents through which wind blows from the middle and side of an instrument panel in the vehicle, into the cabin. The foot vent is a vent through which wind blows toward the feet of a vehicle occupant.

The blower system 1 also includes a filter 21, blower 22, evaporator 23, and heater core 24. The filter 21, blower 22, evaporator 23, and heater core 24 are arranged in this order, from the upstream side to the downstream side in the main duct 11.

The filter 21 is a device that removes dust in the air flowing through the main duct 11, to clean the air. The filter 21 is disposed in proximity to the inside air inlet 15 and the outside air inlet 16 in the main duct 11. The filter 21 may not be provided.

The blower 22 is disposed downstream of the filter 21 in the main duct 11. The blower 22 includes a blower motor 22a and a blower fan 22b. The blower 22 is configured such that, when the blower fan 22b is driven by the blower motor 22a, air inside or outside the vehicle cabin flows into the main duct 11, via the inside air inlet 15 or outside air inlet 16, and the air flows through the main duct 11. Thus, the blower 22 is used for causing the air to flow from the inside air inlet 15 or outside air inlet 16 into the main duct 11, and then into the branch duct 12 and the division ducts 13.

The evaporator 23 is disposed downstream of the blower 22 in the main duct 11. The evaporator 23 cools air, by depriving air around the evaporator 23 of heat of evaporation for evaporating a refrigerant flowing in the evaporator 23. Thus, the evaporator 23 is one example of temperature controllers that heat or cool air flowing to air receiving objects that will be described later. The evaporator 23 is a part of a cooling system which provides a refrigeration cycle. The cooling system also includes a compressor that compresses the refrigerant, a condenser that cools and liquefies the high-temperature refrigerant, and an expansion valve that atomizes the refrigerant thus liquefied. In the cooling system, when the compressor is driven, the refrigerant circulates in the cooling system, so that the air is cooled at around the evaporator 23.

The heater core 24 is disposed downstream of the evaporator 23 in the main duct 11, and is also disposed downstream of the branch portion where the branch duct 12 branches off from the main duct 11. In this embodiment, in particular, the heater core 24 is provided in one (the first air passage 11a) of the passages into which the main air passage is divided by the partition plate 14. A coolant of an internal combustion engine flows in the heater core 24. When the air flows through the heater core 24, the air is heated through heat exchange, because the temperature of the coolant of the engine is higher than the temperature of the atmosphere. Thus, the heater core 24 is one example of the temperature controllers that heat or cool the air flowing to the air receiving objects that will be described later.

In this embodiment, the heater core 24 is used as a device for heating the air in the main duct 11. However, other heating devices, such as the condenser of the cooling system as described above, and an electric heater, may be used, in place of the heater core 24, provided that it can heat the air in the main duct 11.

In addition, the blower system 1 includes a plurality of doors that control flow of the air flowing through the duct 10. In this embodiment, the blower system 1 includes an inside/outside air switching door 31, air mixing door 32, air conditioning door 33, defroster door 34, front vent door 35, side vent door 36, foot vent door 37, and battery door 38.

The inside/outside air switching door 31 is disposed in the vicinity of the inside air inlet 15 and outside air inlet 16 of the main duct 11. The inside/outside air switching door 31 selectively closes one of the inside air inlet 15 and the outside air inlet 16. The outside air inlet 16 is opened when the inside air inlet 15 is closed by the inside/outside air switching door 31, and the inside air inlet 15 is opened when the outside air inlet 16 is closed by the inside/outside air switching door 31. The inside/outside air switching door 31 is driven by a switching door actuator 31a.

The air mixing door 32 is disposed in the vicinity of an upstream end portion of the partition plate 14. The air mixing door 32 controls the ratio of the openings of the first air passage 11a and second air passage 11b separated by the partition plate 14. In other words, the air mixing door 32 controls the ratio of the amounts of air flowing into the first air passage 11a and second air passage 11b. The air mixing door 32 can be set to a position as indicated by a solid line in FIG. 1, where the first air passage 11a is closed and the second air passage 11b is opened, a position as indicated by a broken line in FIG. 1, where the first air passage 11a is opened and the second air passage 11b is closed, and any positions between these positions. The air mixing door 32 is driven by a mixing door actuator 32a. The air mixing door 32 may be a switchable door that can be switched between the above-indicated two positions.

The air conditioning door 33 is disposed in the vicinity of the partition plate 14, and controls the opening of the second air passage 11b as one of the passages into which the main air passage is divided by the partition plate 14. In other words, the air conditioning door 33 controls the amount of air flowing through the second air passage 11b. The air conditioning door 33 can be set to a fully open position as indicated by a solid line in FIG. 1, where the second air passage 11b is fully opened, a fully closed position as indicated by a broken line in FIG. 1, where the second air passage 11b is fully closed, and any positions between these positions. The air conditioning door 33 is driven by an air conditioning door actuator 33a. The air conditioning door 33 may be a switchable door that can be switched between the above-indicated two positions.

The defroster door 34, front vent door 35, side vent door 36, and foot vent door 37 are provided downstream of a merging point of the first air passage 11a and second air passage 11b, and control the openings of air passages to the division ducts 13 that communicate with the defroster vent, front vent, side vent, and foot vent, respectively. In other words, the defroster door 34, front vent door 35, side vent door 36, and foot vent door 37 control the amounts of air flowing into the division ducts 13 that communicate with the defroster vent, front vent, side vent, and foot vent, respectively. The defroster door 34, front vent door 35, side vent door 36, and foot vent door 37 are respectively driven by corresponding door actuators 34a, 35a, 36a, and 37a. The defroster door 34, front vent door 35, side vent door 36, and foot vent door 37 may be switchable doors that can be switched between the fully open position and the fully closed position.

The battery door 38 is disposed in the branch portion where the branch duct 12 branches off from the main duct 11, and controls the opening of a branch air passage defined by the branch duct 12. In other words, the battery door 38 controls the amount of air flowing into the branch air passage. The battery door 38 can be set to a fully open position as indicated by a solid line in FIG. 1, where the branch air passage is fully opened, a fully closed position as indicated by a broken line in FIG. 1, where the branch air passage is closed, and any positions between these positions. The battery door 38 is driven by a battery door actuator 38a. The battery door 38 may be a switchable door that can be switched between the above-indicated two positions.

In this embodiment, the branch air passage defined by the branch duct 12 communicates with the battery 25. Namely, in this embodiment, the branch air passage of the branch duct 12 communicates with an air passage formed around the battery 25. Accordingly, the air flowing into the branch air passage flows through the periphery of the battery 25.

The battery 25 is one example of heat generating device that needs to be cooled using flow of air. In this embodiment, the battery 25 is used for supplying electric power to a motor that drives the vehicle. To charge the battery 25, a generator is driven by the internal combustion engine where the vehicle has the engine, and electric power generated by the generator thus driven is supplied to the battery 25. Alternatively, the battery 25 is changed with power supplied when it is connected to an external power-supply plug. The battery 25 generates heat during charge or discharge, and deteriorates due to the heat as the temperature rises. It is thus necessary to cool the battery 25, so as to curb deterioration of the battery 25. In this embodiment, when the air is supplied to the battery 25, via the branch duct 12, the battery 25 is cooled through heat exchange with the air.

The blower system 1 configured as described above sends air to the battery 25. Thus, the battery 25 may be regarded as an air receiving object of the blower system 1. In addition, the blower system 1 sends air into the vehicle cabin via the air vents. Thus, the vehicle cabin may be regarded as an air receiving object of the blower system 1. Also, in the blower system 1, the air fed into the vehicle cabin passes through an air passage (in particular, a region downstream of the heater core 24 and air conditioning door 33, which will be called "vent communication air passage") 11*c* in the main duct 11 communicating with the air vents. Thus, the blower system 1 may be considered as sending air to the vent communication air passage 11*c*, and the vent communication air passage 11*c* may also be regarded as an air receiving object of the blower system 1. It will be understood from the above description that, in this embodiment, the blower system 1 sends air to a plurality of air receiving objects.

In the blower system 1 configured as described above, feeding of air to the air receiving objects is controlled by the blower 22, and the doors 31 to 38. Thus, the blower 22 and the doors 31 to 38 function as airflow control devices that control feeding of the air to the air receiving objects. The vent communication air passage 11*c* as one of the air receiving objects is an air passage located downstream of at least a part of the airflow control devices. Thus, in this embodiment, the air receiving objects include the air passage located downstream of the airflow control device or devices.

The blower system 1 includes an electronic control unit (ECU) 40, and various sensors 51 to 57. The ECU 40 includes a processor that performs various computations, a memory that stores programs and various kinds of information, and an interface connected to various actuators and various sensors. The ECU 40 functions as a control unit that controls operation of various actuators (e.g., the blower 22, compressor of the cooling system including the evaporator 23, and the actuators 31*a* to 38*a* for the doors 31 to 38) included in the blower system 1, and also functions as an abnormality diagnosis device that performs diagnosis to detect an abnormality in the blower system 1, in particular, an abnormality in various actuators included in the blower system 1.

The blower system 1 includes an intake air temperature sensor 51, blower rotational speed sensor 52, evaporator temperature sensor 53, operation monitoring sensor 54 of the air mixing door, blowoff temperature sensor 55, battery incoming air temperature sensor 56, and battery temperature sensor 57. The sensors 51 to 57 are connected to the ECU 40, and send output signals to the ECU 40.

The intake air temperature sensor 51 detects the temperature of the air flowing into the main duct 11. The intake air temperature sensor 51 is disposed in the main duct 11, at a position downstream of the inside air inlet 15 and outside air inlet 16 and upstream of the evaporator 23. The blower rotational speed sensor 52 detects the rotational speed of the blower 22. The blower rotational speed sensor 52 is mounted on the blower motor 22*a* or blower fan 22*b* of the blower 22. The evaporator temperature sensor 53 detects the temperature of the evaporator 23. The evaporator temperature sensor 53 is mounted on the evaporator 23.

The operation monitoring sensor 54 of the air mixing door detects the operation position (operation angle) of the air mixing door 32. The operation monitoring sensor 54 is mounted on the air mixing door 32. The blowoff temperature sensor 55 detects the temperature of the air in the vent communication air passage 11*c*. The blowoff temperature sensor 55 is disposed in the main duct 11, at a position downstream of the heater core 24 and air conditioning door 33 and upstream of the defroster door 34, front vent door 35, side vent door 36, and foot vent door 37.

The battery incoming air temperature sensor 56 detects the temperature of the air flowing into the branch duct 12, toward the battery 25. The battery incoming air temperature sensor 56 is disposed in the branch duct 12, at a position upstream of the battery 25. The battery temperature sensor 57 detects the temperature of the battery 25. The battery temperature sensor 57 is mounted on the battery 25.

Operating Modes of Blower System

Figure 2:
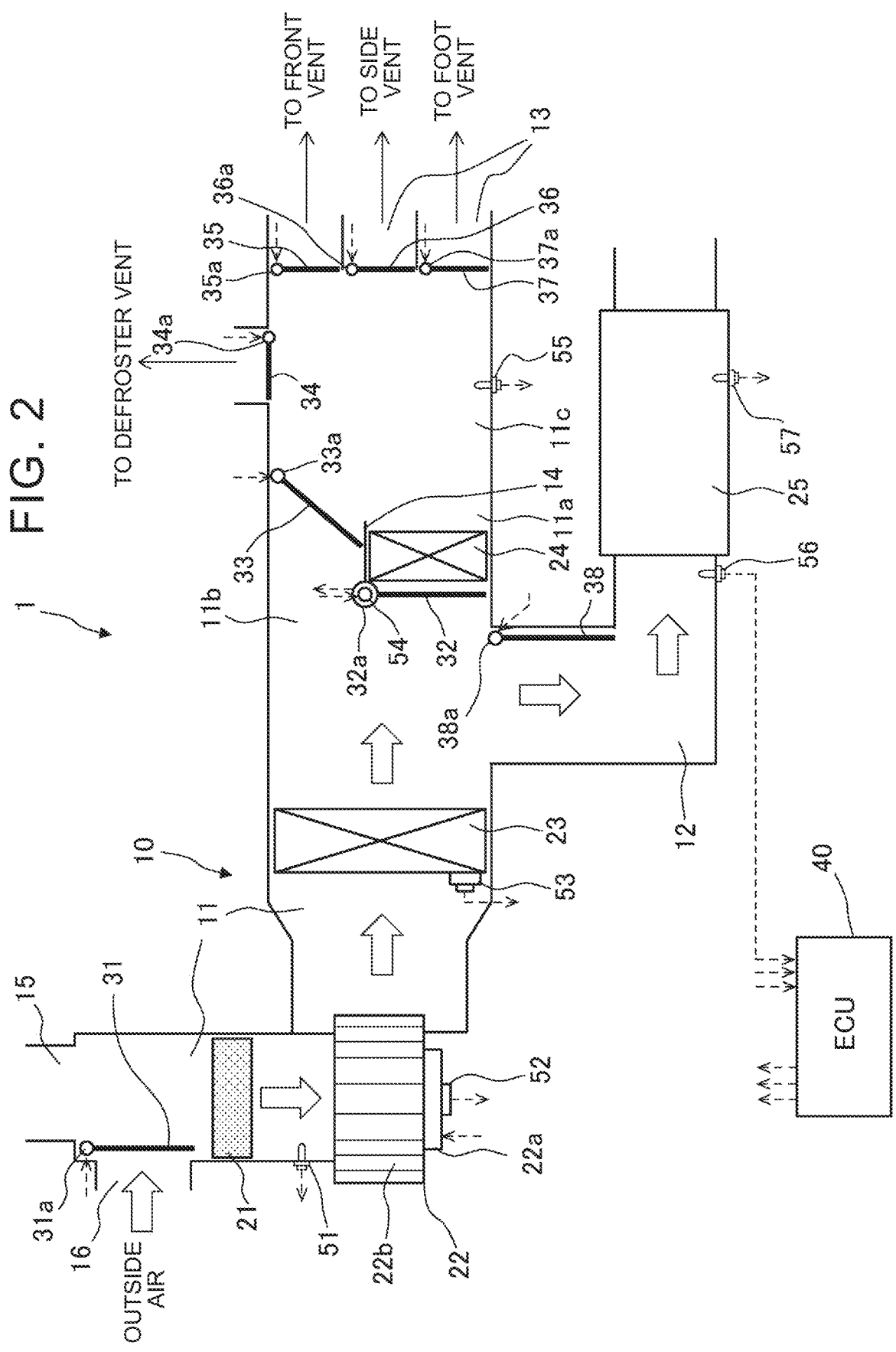
FIG. 2 is a view showing a condition of the blower system in a battery cooling mode in which the blower system is used only for cooling of a battery.

Referring next to FIG. 2 to FIG. 5, the operating modes of the blower system 1 will be described. FIG. 2 shows a condition of the blower system 1 in a battery cooling mode in which the blower system 1 is used only for cooling the battery 25. In FIG. 2 to FIG. 5, arrows indicate flow of air.

In the battery cooling mode, the inside/outside air switching door 31 closes the outside air inlet 16, so that the inside air inlet 15 is opened. Also, the blower 22 is driven, so that the air flows in from the inside air inlet 15, and flows through the main air passage in the main duct 11. The air mixing door 32 closes the first air passage 11*a* in which the heater core 24 is provided, and the air conditioning door 33 closes the second air passage 11*b*. In addition, in the battery cooling mode, the battery door 38 is opened. Also, the cooling system including the evaporator 23 is not operated, and the evaporator 23 does not cool the air.

As a result, in the battery cooling mode, the air flowing from the inside air inlet 15 is sucked by the blower 22, and flows through the main duct 11. Then, the entire amount of the air flowing in the main duct 11 flows into the branch duct 12, and flows toward the battery 25 as an air receiving object. In this manner, the air flows to the battery 25, so that the battery 25 is cooled. In the meantime, the first air passage 11*a* is closed by the air mixing door 32, and the second air passage 11*b* is closed by the air conditioning door 33, so that the air does not flow into the vent communication air passage 11*c* as an air receiving object. In this connection, the cooling system including the evaporator 23 may be operated, for cooling of the battery 25.

Figure 3:
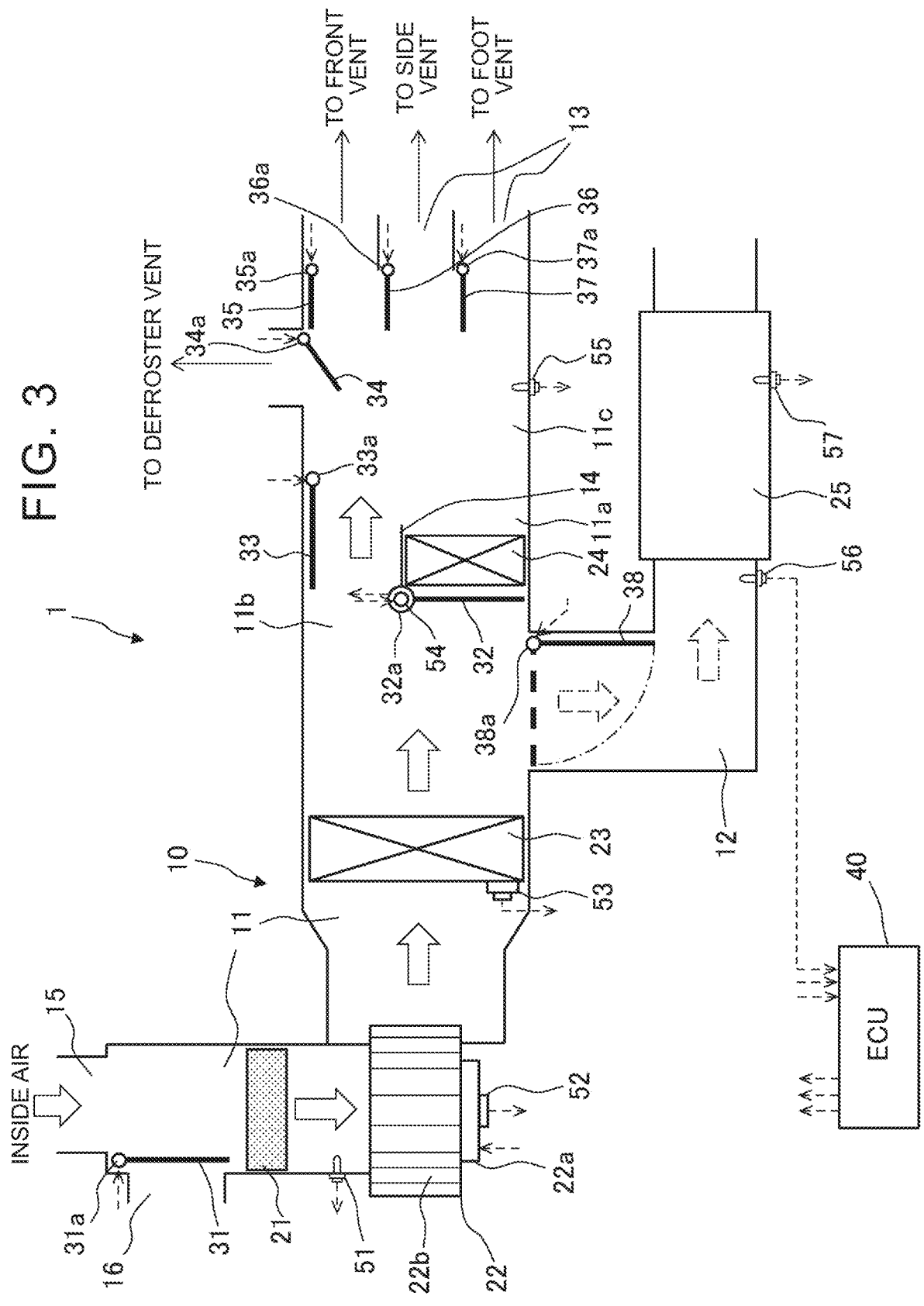
FIG. 3 is a view showing a condition of the blower system in a cooling mode in which the blower system is used for cooling of a vehicle cabin.

FIG. 3 shows a condition of the blower system 1 in a cooling mode used for cooling of the vehicle cabin. In the cooling mode, the inside/outside air switching door 31 may close either of the inside air inlet 15 and the outside air inlet 16. In the example shown in FIG. 3, the outside air inlet 16 is closed. Also, the blower 22 is driven, so that the air flows through the main air passage in the main duct 11. The air mixing door 32 closes the first air passage 11*a* in which the heater core 24 is provided, and the air conditioning door 33 is opened. Also, the battery door 38 is opened when the temperature of the battery 25 is high, and is closed when it is low. In addition, the cooling system including the evaporator 23 is operated, so that the air is cooled by the evaporator 23.

As a result, in the cooling mode, the air flowing from the inside air inlet 15 or outside air inlet 16 is sucked by the blower 22, and flows through the main duct 11. At this time, the air is cooled by the evaporator 23. When the battery door 38 is closed, the entire amount of the air flowing in the main duct 11 passes through the second air passage 11b, and flows into the vent communication air passage 11c as an air receiving object. Then, the cooled air flows into the respective division passages, according to the openings of the corresponding doors 34 to 37. When the battery door 38 is opened, a part of the air flowing in the main duct 11 flows into the branch duct 12, toward the battery 25 as an air receiving object, so that the battery 25 is cooled.

Figure 4:
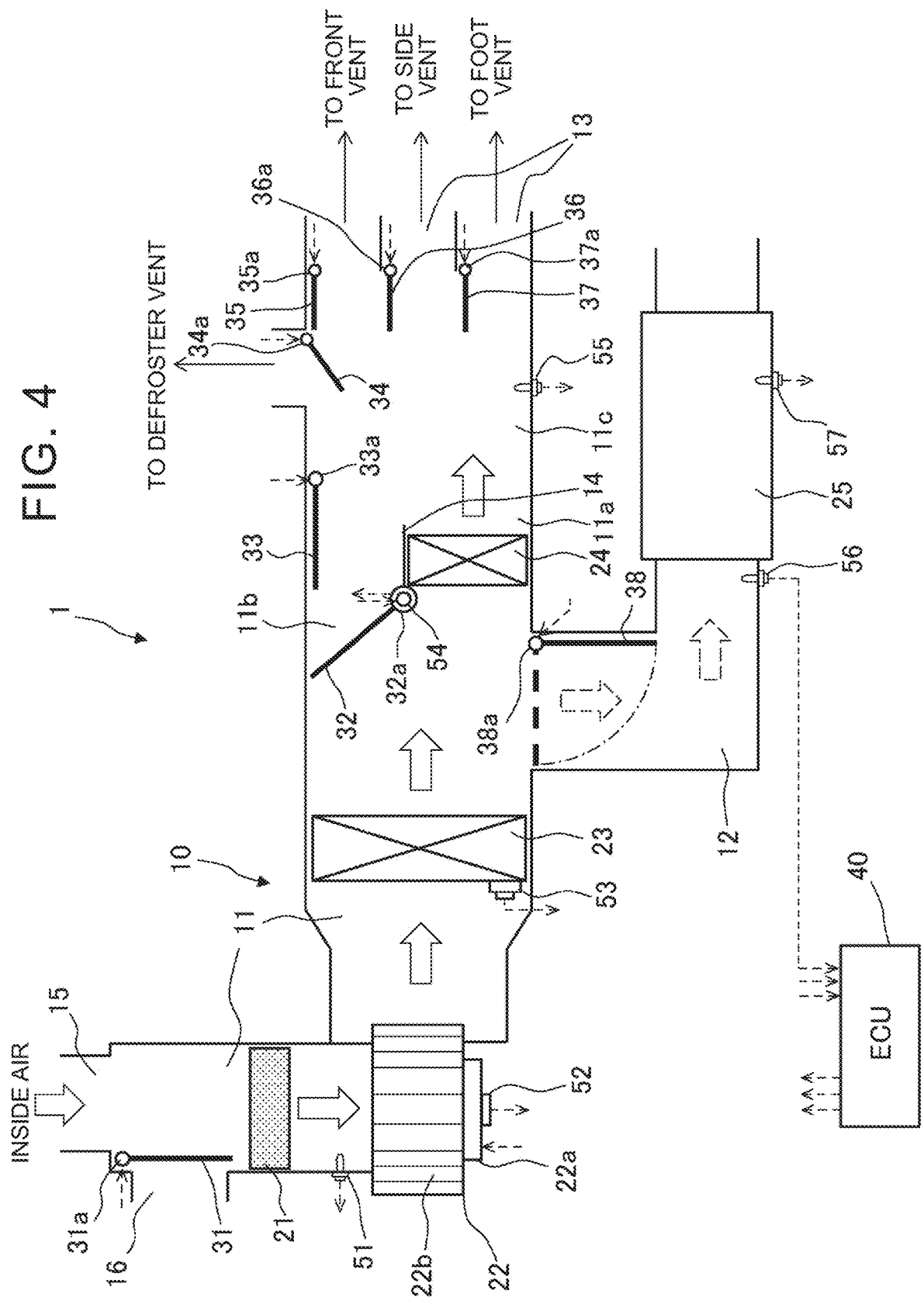
FIG. 4 is a view showing a condition of the blower system in a heating mode in which the blower system is used for heating of the vehicle cabin.

FIG. 4 is a condition of the blower system 1 in a heating mode used for heating of the vehicle cabin. In the heating mode, too, the inside/outside air switching door 31 may close either of the inside air inlet 15 and the outside air inlet 16. Also, the blower 22 is driven, so that the air flows through the main air passage in the main duct 11. The air mixing door 32 opens the first air passage 11a in which the heater core 24 is provided, and closes the second air passage 11b. Also, the battery door 38 is opened when the temperature of the battery 25 is low, and is closed when it is high. The cooling system including the evaporator 23 is not operated, and high-temperature coolant is caused to flow into the heater core 24.

As a result, in the heating mode, the air flowing from the inside air inlet 15 or outside air inlet 16 is sucked by the blower 22, and flows through the main duct 11. When the battery door 38 is closed, the entire amount of the air flowing in the main duct 11 flows through the first air passage 11a, and is heated by the heater core 24. The air thus heated flows into the vent communication air passage 11c as an air receiving object, and flows toward the respective division passages according to the openings of the corresponding doors 34 to 37. When the battery door 38 is opened, a part of the air flowing in the main duct 11 flows into the branch duct 12 before flowing through the heater core 24, and flows toward the battery 25 as an air receiving object, so that the battery 25 is cooled.

Figure 5:
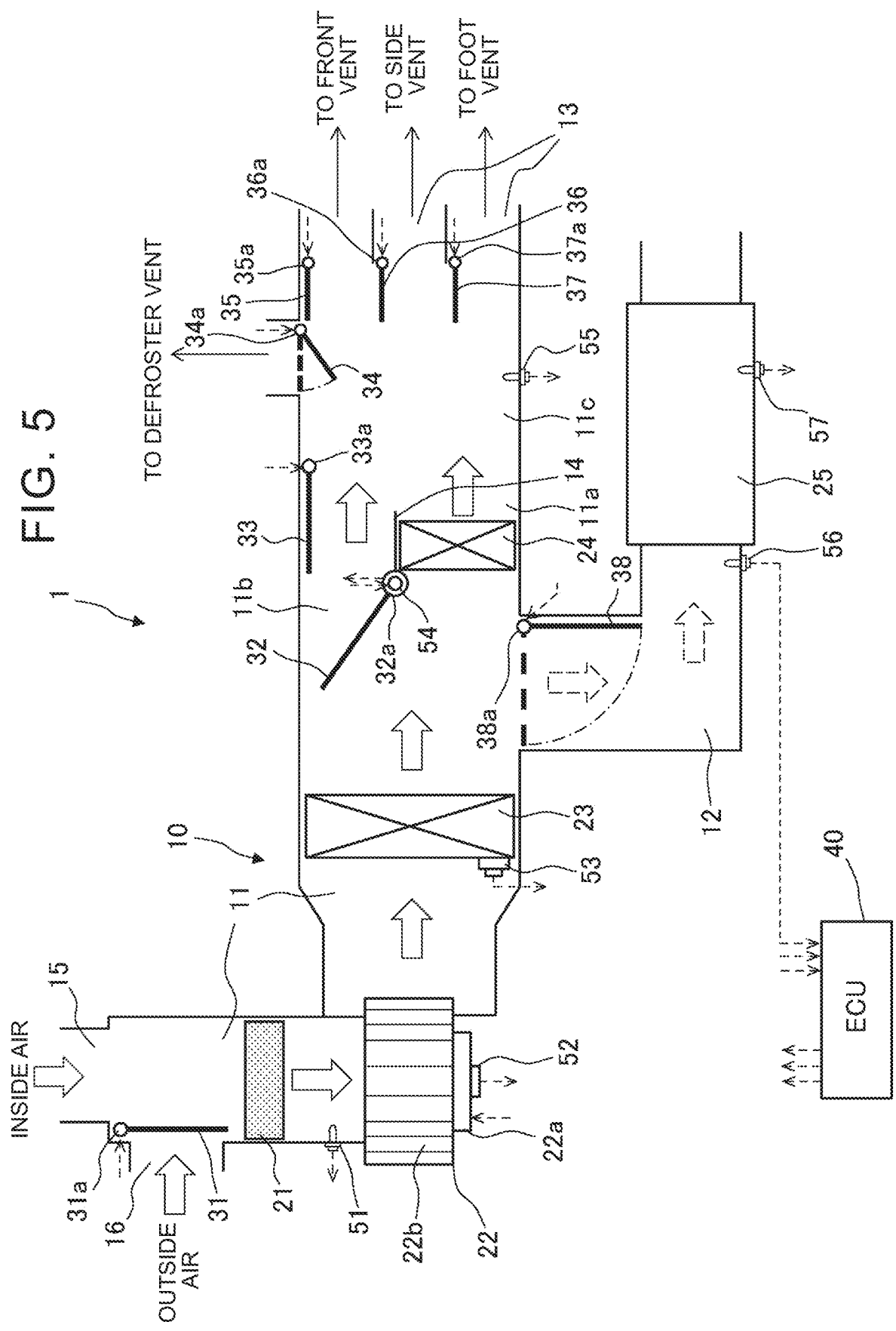
FIG. 5 is a view showing a condition of the blower system in a dehumidification mode in which the blower system is used for dehumidification of the vehicle cabin.

FIG. 5 shows a condition of the blower system 1 in a dehumidification mode used for dehumidification of the vehicle cabin. In the dehumidification mode, the blower 22 and the doors 31 to 37 are basically controlled in similar manners to the heating mode, but the cooling system including the evaporator 23 is operated, unlike the heating mode. Accordingly, the air flowing through the main duct 11 is cooled by the evaporator 23, and is also heated by the heater core 24. As a result, the temperature of the air flowing into the vent communication air passage 11c is equivalent to the temperature of the air flowing into the main duct 11.

Also, in the dehumidification mode, the air mixing door 32 is located at an operating position at which the air flows through the first air passage 11a and the second air passage 11b. The ratio of the amounts of the air flowing through the first air passage 11a and the second air passage 11b changes according to the set temperature, etc.

The operating mode of the blower system 1 is controlled by the ECU 40 that functions as the control unit. The ECU 40 controls the blower motor 22a of the blower 22, the cooling system including the evaporator 23, and actuators, such as the actuators 31a to 38a of the doors 31 to 38, associated with air-feeding in the blower system 1, based on the cabin temperature set by the user, output of a temperature sensor (not shown) that detects the temperature of the vehicle cabin, temperature detected by the battery temperature sensor 57, and so forth.

The operating modes of the blower system 1 as shown in FIG. 2 to FIG. 5 are one example. The blower system 1 may operate in a plurality of operating mode different from the operating modes shown in FIG. 2 to FIG. 5, including an operating mode in which each door is in an operating state between the fully closed state and the fully open state.

Abnormality Diagnosis

As described above, the ECU 40 according to this embodiment functions as the abnormality diagnosis device that detects an abnormality in the blower system 1. In the following description, abnormality diagnosis performed by the ECU 40 will be described.

The temperature of the air receiving object (e.g., the battery 25) or the temperature of air fed to the air receiving object (e.g., the vent communication air passage 11c) when the airflow control devices are in target operating states can be estimated to some extent. The temperature thus estimated is substantially equal to the actually detected temperature, if the airflow control devices are in operating states that are identical with the target operating states. However, when there is an abnormality in any airflow control device, and the actual operating state deviates from the target operating state, the temperature estimated as described above becomes different from the actually detected temperature. Thus, the abnormality diagnosis device according to this embodiment determines that there is an abnormality in the airflow control device, when the temperature (estimated temperature) estimated as described above is largely different from the actual temperature detected.

Figure 6:
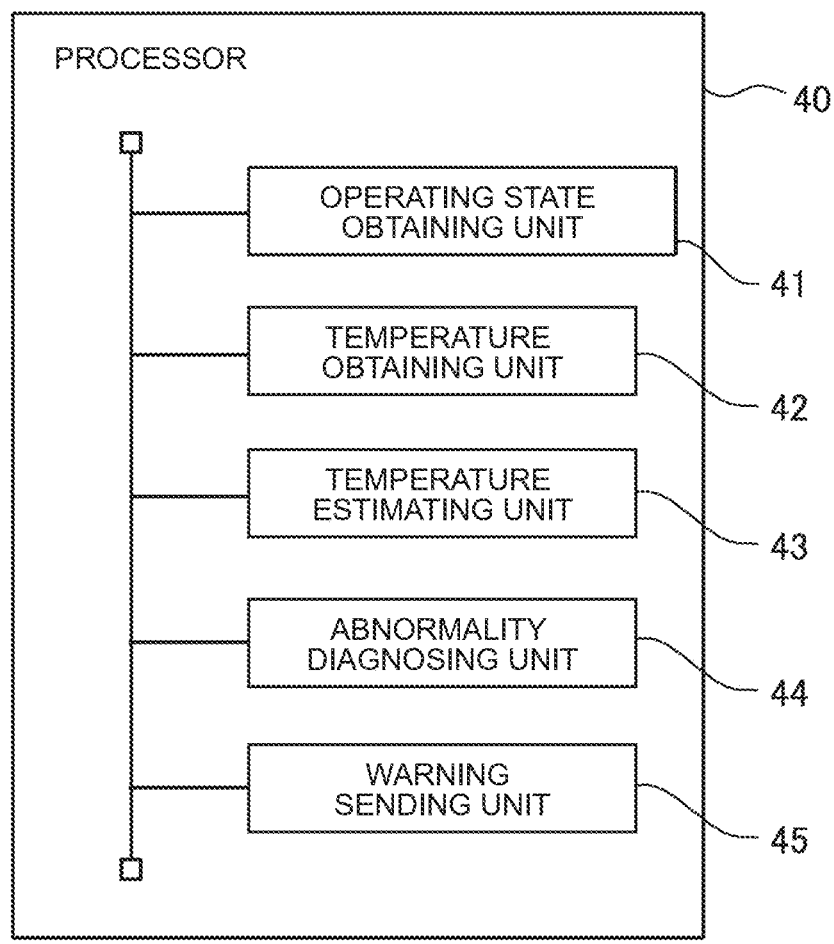
FIG. 6 is a function block diagram of a processor of an electronic control unit (ECU), which is involved with abnormality diagnosis on actuators included in the blower system.

FIG. 6 is a function block diagram of a processor of the ECU 40, which is involved with abnormality diagnosis on the actuators included in the blower system 1. The processor of the ECU 40 includes an operating state obtaining unit 41, temperature obtaining unit 42, temperature estimating unit 43, abnormality diagnosing unit 44, and warning sending unit 45, as function blocks.

The operating state obtaining unit 41 obtains the target operating states of the airflow control devices, namely, the target operating state of each of the actuators of the airflow control devices. In this embodiment, the target operating state of each actuator is obtained, based on a control signal transmitted from the ECU 40 to the actuator. Thus, for example, the target operating state of the blower 22 as an actuator of one of the airflow control devices is obtained, based on a control signal (e.g., a signal indicating a target rotational speed or a signal indicating target electric power to be supplied) transmitted from the ECU 40 to the blower motor 22a of the blower 22. Also, for example, the target operating state of the air conditioning door actuator 33a of the air conditioning door 33 as an actuator of one of the airflow control devices is obtained, based on a control signal transmitted from the ECU 40 to the air conditioning door actuator 33a.

The temperature obtaining unit 42 obtains temperatures detected by temperature sensors that detect the temperatures of air receiving objects or temperature sensors (e.g., the blowoff temperature sensor 55) that detect the temperatures of air fed to the air receiving objects. In this embodiment, in particular, the temperature obtaining unit 42 obtains the temperatures detected by the temperature sensors that detect the respective temperatures of a plurality of air receiving objects, or the temperatures of air fed to the respective air receiving objects. For example, the temperature of the battery 25 as an air receiving object is detected by the battery temperature sensor 57, and the temperature obtaining unit 42 obtains the temperature detected by the battery temperature sensor 57. Also, the temperature of the air fed to the vent communication air passage 11c as an air receiving object is detected by the blowoff temperature sensor 55, and the temperature obtaining unit 42 obtains the temperature detected by the blowoff temperature sensor 55.

The temperature estimating unit 43 estimates the temperature of a certain air receiving object or the temperature of air fed to the air receiving object, based on the target operating states of the airflow control devices. In this embodiment, in particular, the temperature estimating unit 43 estimates the respective temperatures of a plurality of air receiving objects, or the temperatures of air fed to a plurality of air receiving objects. More specifically, in this embodiment, the temperature estimating unit 43 estimates the temperature of the battery 25, based on the target operating states of the airflow control devices. In addition, the temperature estimating unit 43 estimates the temperature of air fed to the vent communication air passage 11c, based on the target operating states of the airflow control devices. In the following description, a method of estimating the temperature of the battery 25, or the temperature of air fed to the vent communication air passage 11c, will be described.

Initially, the method of estimating the temperature of the battery 25 will be described. In this embodiment, the temperature estimating unit 43 estimates the temperature of the battery 25 according to the following equation (1).

$$Tbe(t)=Tbs(t-\Delta t)+\Delta Tbe(t) \quad (1)$$

In Eq. (1) above, Tbe(t) indicates the estimated temperature (° C.) of the battery 25 at time t. Also, Tbs indicates the actual temperature (° C.) of the battery 25 detected by the battery temperature sensor 57, at a point in time that is ahead of time t by a given period of time $\Delta t$.

In addition, $\Delta Tbe$ in Eq. (1) indicates the amount of change (° C.) of the temperature of the battery 25 over a period from a point in time ahead of time t by $\Delta t$, to time t. More specifically, $\Delta Tbe$ is calculated based on the following equations (2) to (4).

$$\Delta Tbe(t)=(Qh(t)-Qc(t))/C \quad (2)$$

$$Qh(t)=Ib^2 \times R \quad (3)$$

$$Qc(t)=K \times Vb \times \Delta T \quad (4)$$

In Eq. (2) above, C is the heat capacity (W/C°) of the battery 25, which is a constant that is empirically obtained in advance or obtained by calculation. In Eq. (2) above, Qh indicates the estimated amount of heat (W) generated by the battery 25 over the period from the point in time ahead of time t by $\Delta t$ to time t. Namely, Qh indicates the amount of heat generated when electric current flows through the battery 25 during charge or discharge of the battery 25, and is calculated according to Eq. (3) above. In Eq. (3) above, Ib indicates electric current (A) that flows through the battery 25 due to charge or discharge of the battery 25, and R indicates the internal resistance ($\Omega$) of the battery 25. The current (A) that passes through the battery 25 is detected with an ammeter, or the like, which is connected to the battery 25, for example, and the internal resistance of the battery 25 is empirically obtained in advance or obtained by calculation.

On the other hand, Qc in Eq. (2) above indicates the estimated amount of heat (W) released from the battery 25 over the period from the point in time ahead of time t by $\Delta t$ to time t. Namely, Qc indicates the amount of heat released from the battery 25 when air is fed to the battery 25, and is calculated according to Eq. (4). K in Eq. (4) above represents the amount of heat released per unit flow rate and unit temperature difference (W/(m³/h·° C.)), which is a constant that is empirically obtained in advance or obtained by calculation. Also, $\Delta T$ in Eq. (4) is a difference (° C.) between the actual temperature T (t–$\Delta t$) of the battery 25 at a point in time ahead of time t by $\Delta t$, and the temperature of air flowing into the battery 25. In this embodiment, the temperature of the air flowing into the battery 25 is detected by the battery incoming air temperature sensor 56.

In addition, Vb in Eq. (4) is the estimated flow rate (m³/h) of air flowing through the battery 25. The estimated flow rate of air flowing through the battery 25 is calculated, using a resistance curve and a blower performance curve as indicated in FIG. 7, based on the target operating states of the airflow control devices.

Figure 7:
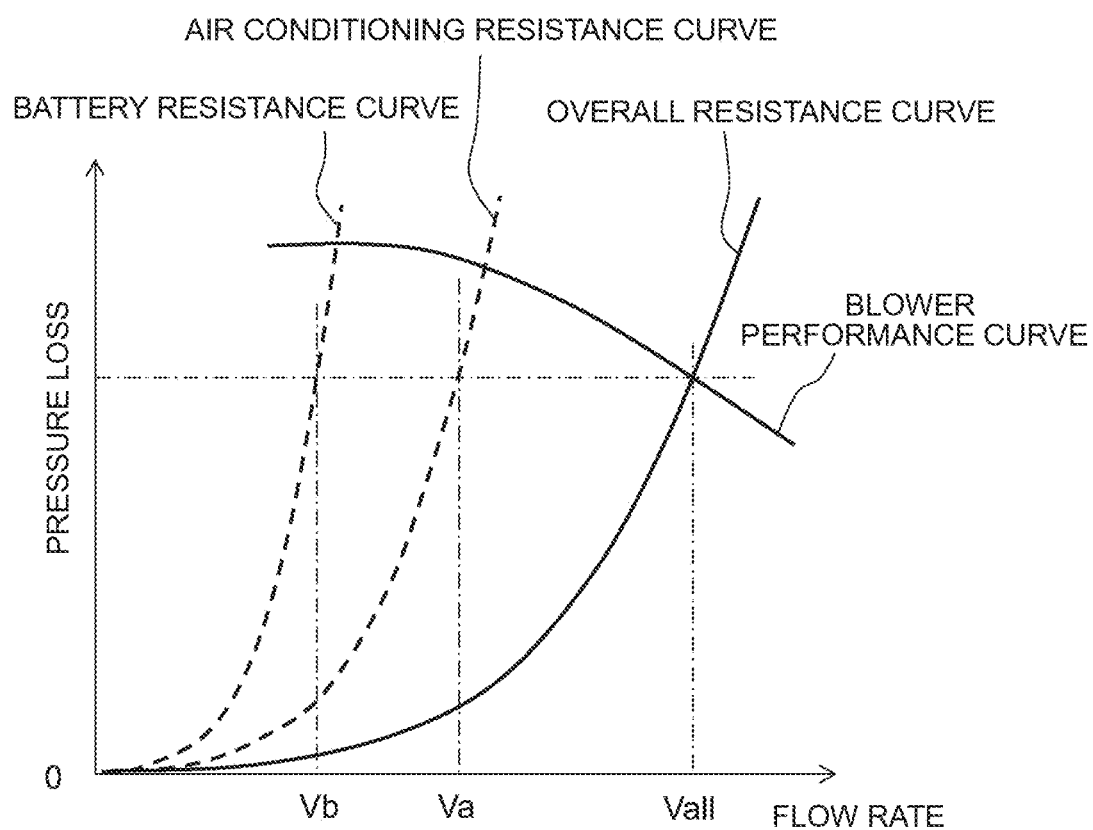
FIG. 7 is a view indicating resistance curves in a duct and a blower performance curve.

FIG. 7 shows resistance curves each indicating the relationship between the flow rate and the pressure loss when air flows through the air passage in the duct 10, and the blower performance curve as the relationship between the pressure loss (channel resistance) and the flow rate when the output of the blower 22 is set to a given value. In FIG. 7, the horizontal axis indicates the flow rate of air flowing in the duct 10, and the vertical axis indicates the pressure loss against the flow of the air.

As is understood from the battery resistance curve representing the resistance against air that flows into the battery 25, the pressure loss against the air increases as the air flowing into the battery 25 increases. The battery resistance curve is empirically obtained in advance or obtained by calculation, and is stored in the memory of the ECU 40. The battery resistance curve changes according to the opening of the battery door 38, and is thus obtained for each opening of the battery door 38 and stored.

Similarly, as is understood from the air conditioning resistance curve representing the resistance against air that flows into the vent communication air passage 11c, the pressure loss against the air increases as the air flowing through the vent communication air passage 11c increases. The air conditioning resistance curve is also empirically obtained in advance or obtained by calculation, and is stored in the memory of the ECU 40. The air conditioning resistance curve changes according to the operation position (operation angle) of the air mixing door 32, operation position (opening) of the air conditioning door 33, and operation positions (openings) of the doors 34 to 37 that communicate with the division ducts. Thus, the air conditioning resistance curve is obtained for each operation position of the doors 32 to 37, and stored.

The overall resistance curve is a resistance curve representing the resistance against the air that flows through the duct 10 as a whole. Thus, the flow rate that is the sum of the flow rate of the battery resistance curve and the flow rate of the air conditioning curve at a given pressure loss is the flow rate of the overall resistance curve.

As is understood from the blower performance curve representing the relationship between the pressure loss and the flow rate when the output of the blower 22 is set to a given value, the flow rate of air that flows through the air passage is reduced as the pressure loss of the air flowing through the air passage increases. The blower performance curve is empirically obtained in advance or obtained by calculation, and is stored in the memory of the ECU 40. The blower performance curve changes according to the set output of the blower 22, and is thus obtained for each set output of the blower 22 and stored.

When the flow rate Vb of the air flowing through the battery 25 is estimated, the blower performance curve corresponding to the target operating state of the blower 22 obtained by the operating state obtaining unit 41 is calculated, based on the target operating state of the blower 22. Further, the battery resistance curve and air conditioning resistance curve corresponding to the target operating states of the actuators 32a to 38a of the doors 32 to 38 obtained by the operating state obtaining unit 41 are calculated, based on the target operating states of the actuators 32a to 38a. In addition, the overall resistance curve is obtained based on the thus calculated battery resistance curve and air conditioning resistance curve. Then, the flow rate at an intersecting point of the overall resistance curve and the blower performance curve is calculated as a total flow rate Vall of the air delivered from the blower 22 and flowing in the duct 10. Also, the flow rate of air at a point on the battery resistance curve having the same pressure loss as that of the intersecting point is calculated as the flow rate Vb of the air flowing to the battery 25 through the branch duct 12. In addition, the flow rate of air at a point on the air conditioning resistance curve having the same pressure loss as that of the intersecting point is calculated as the flow rate Va of the air flowing into the vent communication air passage 11c. The thus calculated flow rate Vb of air flowing through the battery 25 is substituted into Eq. (4) above, so that the temperature of the battery 25 is finally estimated.

When a heat generating device other than the battery 25 is an air receiving object, the temperature estimating unit 43 may estimate the temperature of the heat generating device other than the battery 25. In this case, too, the temperature estimating unit 43 estimates the temperature of the heat generating device, based on the amount of heat generated by the heat generating device and the amount of heat released from the heat generating device. The amount of heat released from the heat generating device is calculated based on the flow rate of air fed to the heat generating device, which is calculated based on the target operating states of the airflow control devices, and a difference between the temperature of the heat generating device and the temperature of the air fed to the heat generating device.

Next, the method of estimating the temperature of the air fed to the vent communication air passage 11c will be described. In this embodiment, the temperature estimating unit 43 estimates the temperature Tat of the air fed to the vent communication air passage 11c, according to the following equation (5).

$$Tat=(1-X) \times Tcool + X \times Thot \quad (5)$$

In Eq. (5) above, X indicates the proportion of the air flowing through the first air passage 11a in which the heater core 24 is provided, in the air flowing into the vent communication air passage 11c. Accordingly, 1−X indicates the proportion of the air flowing through the second air passage 11b in which the heater core 24 is not provided, in the air flowing into the vent communication air passage 11c. The proportion X is calculated based on the targe operating states of the air mixing door 32 and air conditioning door 33.

Tcool indicates the estimated temperature of the air flowing out from the evaporator 23. For example, Tcool is calculated based on the temperature of the air flowing into the main duct 11, the total flow rate Vall of the air delivered from the blower 22 and flowing in the duct 10, and the temperature of the evaporator 23.

More specifically, the relationships between these parameters and the temperature Tcool of the air flowing out from the evaporator 23 are empirically obtained in advance or obtained by calculation, and are stored as a map in the memory of the ECU 40. Then, the temperature of the air flowing into the main duct 11 is detected by the intake air temperature sensor 51, and the total flow rate Vall of the air delivered from the blower 22 and flowing in the duct 10 is calculated based on the relationship indicated in FIG. 7, while the temperature of the evaporator 23 is detected by the evaporator temperature sensor 53. The estimated temperature Tcool of the air flowing out from the evaporator 23 is calculated, based on the values thus detected or calculated, and the above-mentioned map.

Thot indicates the estimated temperature of the air flowing out from the heater core 24. For example, Thot is calculated, based on the estimated temperature Tcool of the air flowing out from the evaporator 23, the flow rate of the air flowing through the heater core 24, and the temperature of the heater core 24.

More specifically, the relationships between these parameters and the temperature Thot of the air flowing out from the heater core 24 are empirically obtained in advance or obtained by calculation, and are stored as a map in the memory of the ECU 40. Then, the estimated temperature Tcool of the air flowing out from the evaporator 23 is calculated in the manner as described above. Also, the flow rate of the air flowing through the heater core 24 is calculated by multiplying the flow rate Va of the air flowing into the vent communication air passage 11c, which is calculated as described above, by the above-indicated proportion X. Further, the temperature of the heater core 24 is detected by a water temperature sensor (not shown) that detects the temperature of a coolant flowing in the heater core.

In this embodiment, the temperature detected by the battery incoming air temperature sensor 56 is used, as the temperature of the air flowing into the battery 25, which is used when estimating the temperature of the battery 25. However, where the battery incoming air temperature sensor 56 is not provided, the estimated temperature Tcool of the air flowing out from the evaporator 23, which is calculated as described above, may be used as the temperature of the air flowing into the battery 25, which is used when estimating the temperature of the battery 25.

The abnormality diagnosing unit 44 performs an abnormality diagnosis on the blower system 1, in particular, on the airflow control devices. More specifically, when a difference between the actual temperature of a certain air receiving object obtained by the temperature obtaining unit 42 and the estimated temperature of the same air receiving object estimated by the temperature estimating unit 43 is equal to or larger than a reference value, the abnormality diagnosing unit 44 determines that there is an abnormality in the airflow control device associated with the air receiving object. Also, when a difference between the actual temperature of the air fed to a certain air receiving object obtained by the temperature obtaining unit 42, and the estimated temperature of the air fed to the same air receiving object estimated by the temperature estimating unit 43 is equal to or larger than a reference value, the abnormality diagnosing unit 44 determines that there is an abnormality in the airflow control device.

Initially, an abnormality diagnosis on the air conditioning door 33 will be specifically described. When there is no abnormality in the air conditioning door 33, the actual temperature and estimated temperature of the air fed to the vent communication air passage 11c become substantially the same temperature, in the dehumidification mode. However, when there is an abnormality in the air conditioning door 33, the ratio of the air flowing in the first air passage 11a in which the heater core 24 is provided and the air flowing in the second air passage 11b in which the heater core 24 is not provided deviates from the target ratio; as a result, the estimated temperature of the air fed to the vent communication air passage 11c largely deviates from the actual temperature.

In this embodiment, the blower rotational speed sensor 52 is mounted on the blower 22. Accordingly, the abnormality diagnosing unit 44 can determine whether there is an abnormality in the blower 22, based on the output of the blower rotational speed sensor 52. In addition, in this embodiment, the operation monitoring sensor 54 is mounted on the air mixing door 32. Accordingly, the abnormality diagnosing unit 44 can determine whether there is an abnormality in the air mixing door 32, based on the output of the operation monitoring sensor 54.

Thus, in this embodiment, when the abnormality diagnosing unit 44 determines that there is no abnormality in the blower 22 and the air mixing door 32, and a difference between the actual temperature of the air fed to the vent communication air passage 11c obtained by the temperature obtaining unit 42 and the estimated temperature of the air fed to the vent communication air passage 11c estimated by the temperature estimating unit 43 is equal to or larger than a reference value, in the dehumidification mode shown in FIG. 5, the abnormality diagnosing unit 44 determines that there is an abnormality in the air conditioning door 33. For example, the reference value is set to the minimum value of the difference between the actual temperature and estimated temperature of the air fed to the vent communication air passage 11c, which value can be taken only when there is an abnormality in the air conditioning door 33, or a value larger than the minimum value.

Namely, in this embodiment, the blower 22, air mixing door 32, and air conditioning door 33 function as the airflow control devices that control the flow rate of the air flowing into the vent communication air passage 11c as an air receiving object. Of these airflow control devices, the blower 22 and the air mixing door 32 are the airflow control devices (second airflow control devices) on which an abnormality diagnosis can be performed, based on the rotational speed of the blower 22 and the output of the operation monitoring sensor 54 as parameters other than the temperature of the air fed to the vent communication air passage 11c. On the other hand, in this embodiment, the air conditioning door 33 is the airflow control device (first airflow control device) on which an abnormality diagnosis cannot be performed, based on a parameter other than the temperature of the air fed to the vent communication air passage 11c. Then, the abnormality diagnosing unit 44 performs abnormality diagnosis on the blower 22 and the air mixing door 32, based on the rotational speed of the blower 22 and the output of the operation monitoring sensor 54 as parameters other than the temperature of the air fed to the vent communication air passage 11c. When the abnormality diagnosing unit 44 determines that there is no abnormality in the blower 22 and the air mixing door 32, it determines that there is an abnormality in the air conditioning door 33 if the difference between the actual temperature and estimated temperature of the air fed to the vent communication air passage 11c is equal to or larger than the reference value.

In the above example, an abnormality diagnosis on the air conditioning door 33 is performed, based on the temperature of the air fed to the vent communication air passage 11c in the dehumidification mode shown in FIG. 5. However, the abnormality diagnosis on the air conditioning door 33 may be performed, based on the temperature of the air fed to the vent communication air passage 11c in a mode other than the dehumidification mode. However, the temperature of the air fed to the vent communication air passage 11c is equal to the temperature of the incoming air, when the air is not cooled by the evaporator 23 nor heated by the heater core 24 by the time when it reaches the vent communication air passage 11c. Accordingly, in this case, the actual temperature of the air fed to the vent communication air passage 11c coincides with the estimated temperature of the air fed to the vent communication air passage 11c, which is calculated based on the temperature detected by the intake air temperature sensor 51, irrespective of the operating states of the airflow control devices. Thus, where the air receiving object is the vent communication air passage 11c located downstream of the airflow control devices, the abnormality diagnosing unit 44 determines that there is an abnormality in the air conditioning door 33, when the difference between the actual temperature and estimated temperature of the air fed to the vent communication air passage 11c, which is obtained when the air flowing toward the vent communication air passage 11c is heated or cooled by the temperature controller (e.g., the evaporator 23, heater core 24) that heats or cools the air flowing toward the vent communication air passage 11c, is equal to or larger than the reference value. On the other hand, when the air flowing toward the vent communication air passage 11c is not heated nor cooled by the temperature controller that heats or cools the air flowing toward the vent communication air passage 11c, the abnormality diagnosing unit 44 does not determine that the air conditioning door 33 is normal, even when the difference between the actual temperature and estimated temperature of the air fed to the vent communication air passage 11c is smaller than the reference value.

Next, an abnormality diagnosis on the battery door 38 will be specifically described. When there is no abnormality in the battery door 38, the actual temperature of the battery 25 and the estimated temperature of the battery 25 become substantially the same temperature, in the operating mode in which the air mixing door 32 is open. However, if there is an abnormality in the battery door 38, the flow rate of the air flowing through the battery 25 deviates largely from a target value; as a result, the estimated temperature of the battery 25 deviates largely from the actual temperature of the battery 25.

Thus, in this embodiment, when the abnormality diagnosing unit 44 determines that there is no abnormality in the blower 22 and the air mixing door 32, it determines that there is an abnormality in the battery door 38 in the case where a difference between the actual temperature of the battery 25 obtained by the temperature obtaining unit 42 and the estimated temperature of the battery 25 estimated by the temperature estimating unit 43 is equal to or larger than a reference value, in the operating mode in which the air mixing door 32 is open. For example, the reference value is set to the minimum value of the difference between the actual temperature and estimated temperature of the battery 25, which can be taken only when there is an abnormality in the battery door 38, or a value larger than the minimum value.

Namely, in this embodiment, the blower 22, air mixing door 32, and battery door 38 function as the airflow control devices that control the flow rate of the air to the battery 25 as an air receiving object. Of these airflow control devices, the blower 22 and the air mixing door 32 are the airflow control devices (second airflow control devices) on which an abnormality diagnosis can be performed, based on the rotational speed of the blower 22 and the output of the operation monitoring sensor 54 as parameters other than the temperature of the air fed to the battery 25. On the other hand, in this embodiment, the battery door 38 is the airflow control device (first airflow control device) on which an abnormality diagnosis cannot be performed, based on a parameter other than the temperature of the air fed to the battery 25. Then, the abnormality diagnosing unit 44 performs abnormality diagnosis on the blower 22 and the air mixing door 32, based on the rotational speed of the blower 22 and the output of the operation monitoring sensor 54 as the parameters other than the temperature of the air fed to the battery 25. Then, when the abnormality diagnosing unit 44 determines that there is no abnormality in the blower 22 and the air mixing door 32, it determines that there is an abnormality in the battery door 38, when the difference between the actual temperature and estimated temperature of the battery 25 is equal to or larger than the reference value.

Thus, in this embodiment, when a difference between the actual temperature and estimated temperature of each of two or more air receiving objects is equal to or larger than the corresponding reference value, the abnormality diagnosing unit 44 determines that there is an abnormality in the airflow control device related to air feeding to the air receiving object concerned.

When the abnormality diagnosing unit 44 determines that there is an abnormality in any airflow control device, the warning sending unit 45 of the ECU 40 sends a signal to a warning device, so as to generate a warning to the user of the blower system 1. As the warning device, a warning, etc. provided in a meter panel, a speaker that provides a warning to the user via voice, a display that displays a warning on a screen, or the like, is used.

Flowchart

Figure 8:
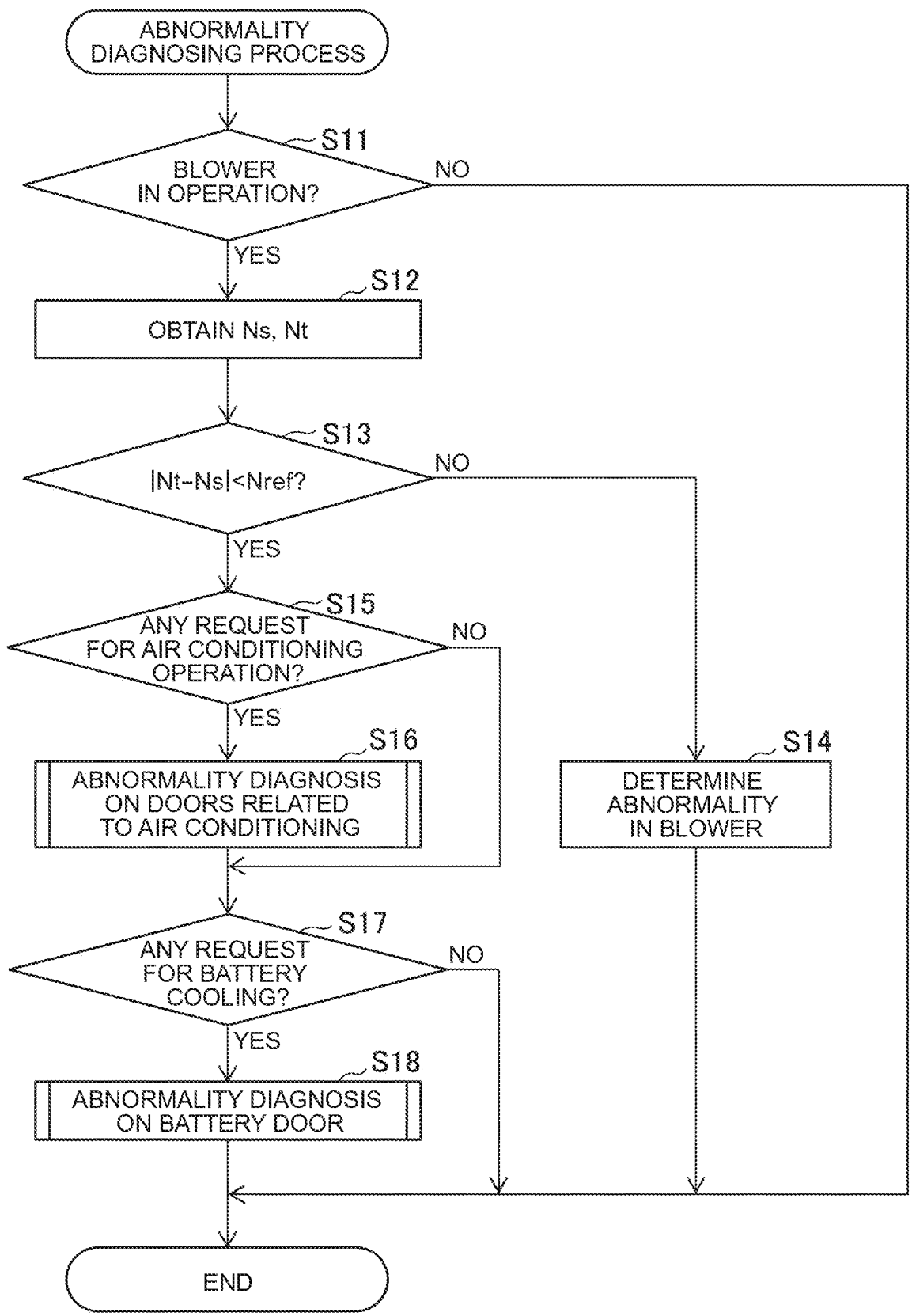
FIG. 8 is a flowchart illustrating a control routine of an abnormality diagnosing process executed by an abnormality diagnosing unit.
Figure 9:
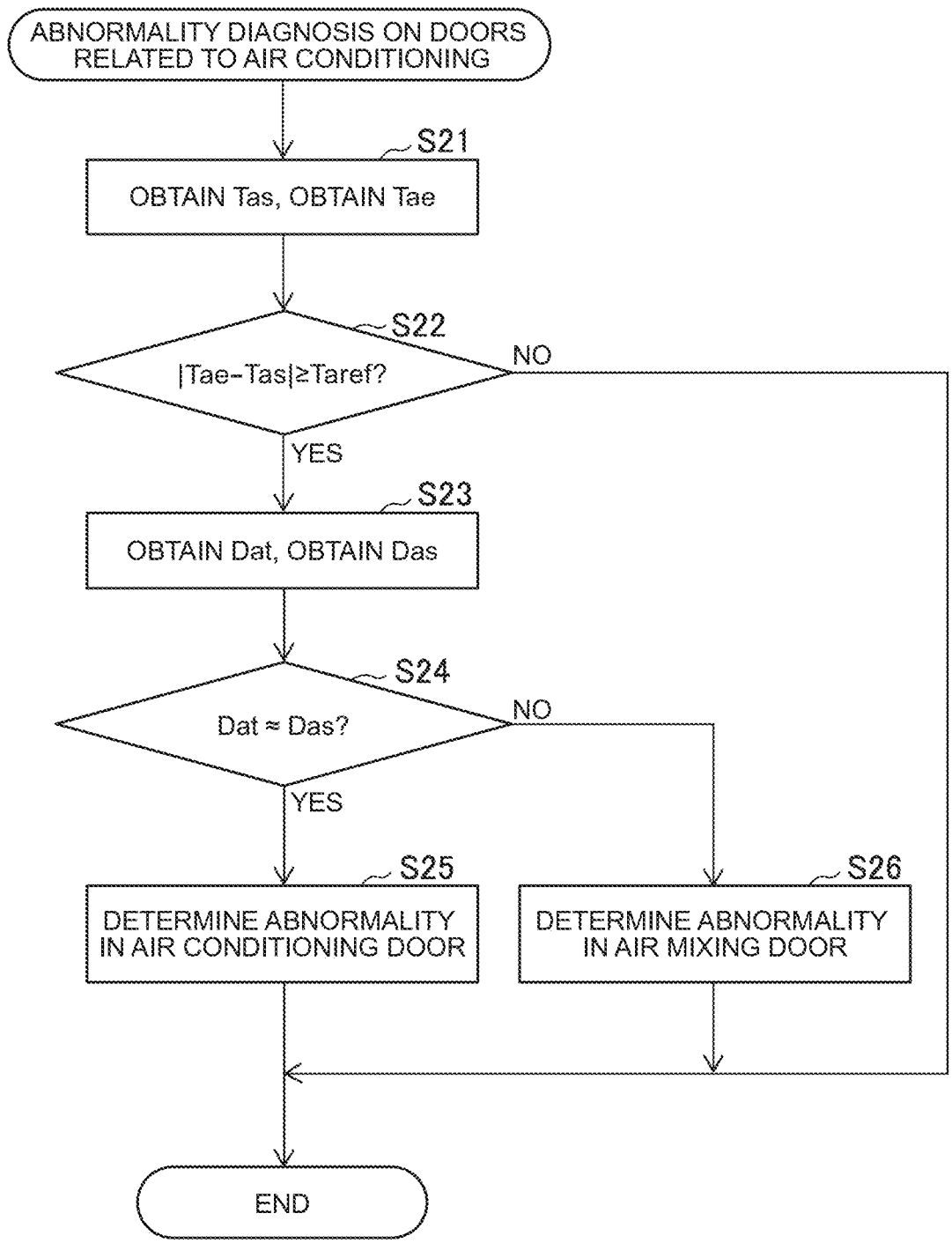
FIG. 9 is a flowchart illustrating a control routine of an abnormality diagnosing process performed on doors related to air conditioning in step S16 of FIG. 8.
Figure 10:
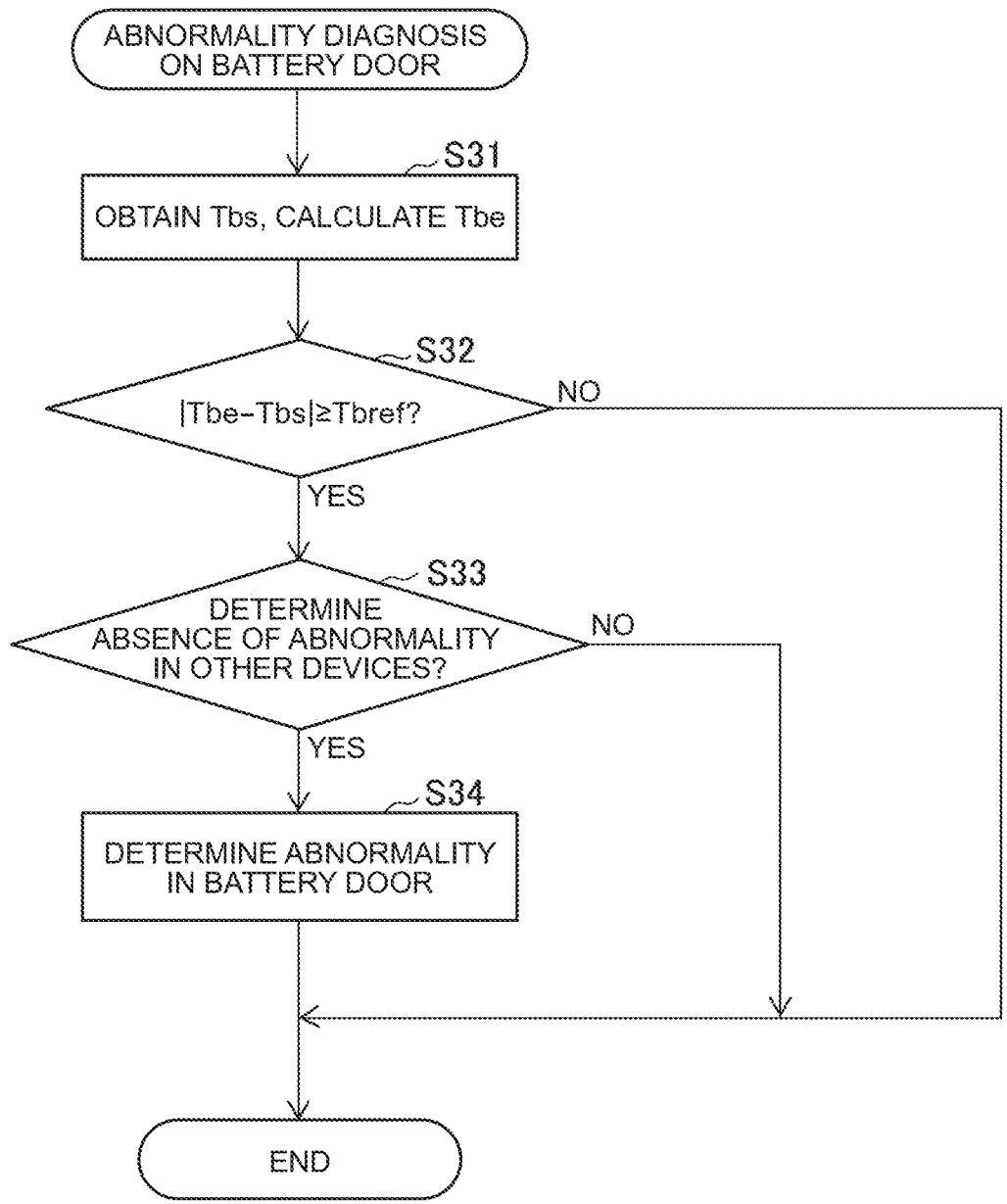
FIG. 10 is a flowchart illustrating a control routine of an abnormality diagnosing process performed on a battery door in step S18 of FIG. 8.

Referring to FIG. 8 to FIG. 10, an abnormality diagnosing process for detecting an abnormality in the actuators included in the blower system 1 will be described. FIG. 8 is a flowchart illustrating a control routine of the abnormality diagnosing process executed by the abnormality diagnosing unit 44. The control routine illustrated in FIG. 8 is executed at intervals of a fixed time.

Initially, the abnormality diagnosing unit 44 determines in step S11 whether the blower 22 is in operation. Whether the blower 22 is in operation is determined based on a control signal to the blower 22. When the abnormality diagnosing unit 44 determines in step S11 that the blower 22 is not in operation, the control routine ends. On the other hand, when the abnormality diagnosing unit 44 determines in step S11 that the blower 22 is in operation, it proceeds to step S12.

In step S12, the abnormality diagnosing unit 44 obtains the actual rotational speed Ns of the blower 22, and also obtains the target rotational speed Nt of the blower 22. The actual rotational speed Ns of the blower 22 is detected by the blower rotational speed sensor 52, for example, and the target rotational speed Nt is calculated based on a control signal to the blower 22.

Then, the abnormality diagnosing unit 44 determines in step S13 whether a difference between the actual rotational speed Ns and the target rotational speed Nt is smaller than a reference value Nref. When the difference between the actual rotational speed Ns and the target rotational speed Nt is equal to or larger than the reference value Nref, the control proceeds to step S14. In step S14, the abnormality diagnosing unit 44 determines that there is an abnormality in the blower 22, and provides a warning to the user. Then, the control routine ends. On the other hand, when the abnormality diagnosing unit 44 determines in step S13 that the difference between the actual rotational speed Ns and the target rotational speed Nt is smaller than the reference value Nref, it proceeds to step S15.

In step S15, the abnormality diagnosing unit 44 determines whether there is a request for implementing an operating mode that requires air conditioning, such as cooling, heating, and dehumidification. When the abnormality diagnosing unit 44 determines in step S15 that there is no request for implementing any operating mode that requires air conditioning, it skips step S16. On the other hand, when the abnormality diagnosing unit 44 determines in step S15 that there is a request for implementing an operating mode that requires air conditioning, it proceeds to step S16. In step S16, the abnormality diagnosing unit 44 executes an abnormality diagnosing process on doors related to air conditioning, as shown in FIG. 9.

In step S17, the abnormality diagnosing unit 44 determines whether there is a request for cooling the battery 25. When the abnormality diagnosing unit 44 determines in step S17 that there is no request for cooling the battery 25, it skips step S18. On the other hand, when the abnormality diagnosing unit 44 determines in step S17 that there is a request for cooling the battery 25, it proceeds to step S18. In step S18, the abnormality diagnosing unit 44 executes an abnormality diagnosing process on the battery door 38 as shown in FIG. 10.

FIG. 9 is a flowchart illustrating a control routine of the abnormality diagnosing process performed on the doors related to air conditioning in step S16 of FIG. 8. As shown in FIG. 9, the abnormality diagnosing unit 44 initially executes step S21 to obtain the actual temperature Tas and estimated temperature Tae of the air in the vent communication air passage 11c. The actual temperature Tas of the air in the vent communication air passage 11c is obtained from the blowoff temperature sensor 55 via the temperature obtaining unit 42. The estimated temperature Tae of the air in the vent communication air passage 11c is obtained from the temperature estimating unit 43.

Then, the abnormality diagnosing unit 44 determines in step S22 whether a difference between the actual temperature Tas and estimated temperature Tae of the air in the vent communication air passage 11c is equal to or larger than a reference value Taref. When the abnormality diagnosing unit 44 determines in step S22 that the difference between the actual temperature Tas and the estimated temperature Tae is smaller than the reference value Taref, the control routine ends. On the other hand, when the abnormality diagnosing unit 44 determines in step S22 that the difference between the actual temperature Tas and the estimated temperature Tae is equal to or larger than the reference value Taref, it proceeds to step S23.

In step S23, the abnormality diagnosing unit 44 obtains the target operation angle Dat and actual operation angle Das of the air mixing door 32. The target operation angle Dat of the air mixing door 32 is calculated based on a control signal from the ECU 40. On the other hand, the actual operation angle Das of the air mixing door 32 is detected by the operation monitoring sensor 54.

Then, in step S24, the abnormality diagnosing unit 44 determines whether the actual operation angle Das is substantially equal to the target operation angle Dat. When the abnormality diagnosing unit 44 determines that the actual operation angle Das is substantially equal to the target operation angle Dat, it proceeds to step S25. In step S25, the abnormality diagnosing unit 44 determines that there is an abnormality in the air conditioning door 33, and provides a warning to the user. On the other hand, when the abnormality diagnosing unit 44 determines in step S24 that the actual operation angle Das largely deviates from the target operation angle Dat, it proceeds to step S26. In step S26, the abnormality diagnosing unit 44 determines that there is an abnormality in the air mixing door 32, and provides a warning to the user.

FIG. 10 is a flowchart illustrating a control routine of the abnormality diagnosing process performed on the battery door 38 in step S18 of FIG. 8. As shown in FIG. 10, initially in step S31, the abnormality diagnosing unit 44 obtains the actual temperature Tbs of the battery 25 and the estimated temperature Tbe of the battery 25. The actual temperature Tbs of the battery 25 is obtained from the battery temperature sensor 57 via the temperature obtaining unit 42. The estimated temperature Tae of the battery 25 is obtained from the temperature estimating unit 43.

Then, the abnormality diagnosing unit 44 determines in step S32 whether a difference between the actual temperature Tbs and estimated temperature Tbe of the battery 25 is equal to or larger than a reference value Tbref. When the abnormality diagnosing unit 44 determines in step S32 that the difference between the actual temperature Tbs and the estimated temperature Tbe is smaller than the reference value Tbref, the control routine ends. On the other hand, when the abnormality diagnosing unit 44 determines in step S32 that the difference between the actual temperature Tbs and the estimated temperature Tbe is equal to or larger than the reference value Tbref, it proceeds to step S33.

In step S33, the abnormality diagnosing unit 44 determines whether the abnormality diagnosis has been performed on devices other than the battery door 38, namely, the blower 22, air mixing door 32, and air conditioning door 33. When the abnormality diagnosis has been performed on the devices other than the battery door 38, the control routine ends. On the other hand, when the abnormality diagnosing unit 44 determines in step S33 that the abnormality diagnosis has not been performed on the devices other than the battery door 38, it proceeds to step S34. In step S34, the abnormality diagnosing unit 44 determines that there is an abnormality in the battery door 38, and provides a warning to the user.

While the preferred embodiment of the disclosure has been described, the disclosure is not limited to the embodiment, but various modifications or changes may be made within the range of description of the appended claims.

What is claimed is:

1. An abnormality diagnosis device for performing an abnormality diagnosis on a blower system configured to send air to a plurality of air receiving objects, the abnormality diagnosis device comprising:
a processor configured to
obtain a target operating state of an airflow control device configured to control flow of air to the plurality of air receiving objects,
obtain a first temperature detected by a temperature sensor, wherein the first temperature is a temperature of air fed to a first air receiving object among the plurality of air receiving objects or a temperature of the first air receiving object,
estimate the first temperature, based on the target operating state of the airflow control device, and
perform an abnormality diagnosis on the airflow control device,
wherein
the processor is configured to, in response to a difference between the detected first temperature and the estimated first temperature being equal to or larger than a predetermined first reference value, determine that there is an abnormality in the airflow control device,
the airflow control device comprises a first airflow control device and a second airflow control device configured to control a flow rate of the air fed to the first air receiving object, and the processor is configured to
perform the abnormality diagnosis on the second airflow control device, based on a parameter other than the first temperature, and
in response to (i) determining that there is no abnormality in the second airflow control device, and (ii) the difference between the detected first temperature and the estimated first temperature being equal to or larger than the predetermined first reference value, determine that there is an abnormality in the first airflow control device.

2. The abnormality diagnosis device according to claim 1, wherein
the first air receiving object is an air passage located downstream of the airflow control device, and the first temperature is a temperature of air in the air passage, and
the processor is configured to,
in response to (i) air that flows toward the first air receiving object being heated or cooled by a temperature controller configured to heat or cool the air flowing toward the first air receiving object, and (ii) the difference between the detected first temperature and the estimated first temperature being equal to or larger than the first reference value,
determine that there is an abnormality in the first airflow control device.

3. The abnormality diagnosis device according to claim 2, wherein the air passage as the first air receiving object communicates with a vent that is open to a vehicle cabin.

4. The abnormality diagnosis device according to claim 1, wherein
the blower system includes a first air passage and a second air passage which lead to the first air receiving object,
the first airflow control device is an air conditioning door configured to control an opening of the second air passage, and
the second airflow control device is
a blower configured to blow air to the first air passage and the second air passage, or
an air mixing door configured to control a ratio of openings of the first air passage and the second air passage.

5. The abnormality diagnosis device according to claim 1, wherein the first air receiving object is a heat generating device, and the first temperature is a temperature of the heat generating device.

6. The abnormality diagnosis device according to claim 5, wherein
the processor is configured to estimate the temperature of the heat generating device, based on an amount of heat released from the heat generating device, and
the amount of heat released from the heat generating device is calculated, based on
(i) a flow rate of air fed to the heat generating device calculated based on the target operating state of the airflow control device, and
(ii) a difference between the temperature of the heat generating device and a temperature of the air fed to the heat generating device.

7. The abnormality diagnosis device according to claim 6, wherein the heat generating device is a battery.

8. The abnormality diagnosis device according to claim 1, wherein the first airflow control device is a battery door configured to control an opening of a branch air passage that communicates with a battery as the first air receiving object; and the second airflow control device is a blower configured to blow air into the branch air passage.

9. The abnormality diagnosis device according to claim 1, wherein the processor is configured to, in response to determining that there is an abnormality in the first airflow control device or an abnormality in the second airflow control device, send a signal to a warning device to generate a warning to a user of the blower system.

* * * * *